United States Patent
Dwivedi et al.

(10) Patent No.: US 11,731,843 B1
(45) Date of Patent: Aug. 22, 2023

(54) CONVEYANCE CONSTRAINT

(71) Applicant: Amazon Technologies, Inc., Seattle, WA (US)

(72) Inventors: Rajeev Dwivedi, Sammamish, WA (US); Ganesh Krishnamoorthy, Seattle, WA (US); Michael Alan Bray, Elkhorn, NE (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/574,145

(22) Filed: Jan. 12, 2022

(51) Int. Cl.
*B65G 47/76* (2006.01)
*B65G 21/20* (2006.01)
*B07B 13/04* (2006.01)
*B65G 47/82* (2006.01)
*B65G 47/88* (2006.01)
*B07B 13/00* (2006.01)
*B07C 1/14* (2006.01)
*B65G 21/08* (2006.01)

(52) U.S. Cl.
CPC .......... *B65G 47/766* (2013.01); *B07B 13/003* (2013.01); *B07B 13/04* (2013.01); *B07C 1/14* (2013.01); *B65G 21/2063* (2013.01); *B65G 47/82* (2013.01); *B65G 47/8838* (2013.01); *B65G 21/08* (2013.01); *B65G 2203/0208* (2013.01); *B65G 2205/02* (2013.01); *B65G 2207/08* (2013.01)

(58) Field of Classification Search
CPC ................ B65G 21/08; B65G 21/2063; B65G 21/2072; B65G 47/256; B65G 47/689; B65G 47/763; B65G 47/766; B65G 47/82; B65G 47/883; B65G 47/8838; B65G 47/8853; B65G 2203/0208; B65G 2205/02; B65G 2205/04; B65G 2207/08; B65G 2207/40; B07B 13/003; B07B 13/04; B07B 13/05; B07C 1/14
See application file for complete search history.

(56) References Cited

U.S. PATENT DOCUMENTS

| | | | | |
|---|---|---|---|---|
| 1,532,228 A | * | 4/1925 | Carpenter | B65G 47/766 198/367 |
| 2,701,638 A | * | 2/1955 | Petro | B65G 47/766 209/661 |
| 2,803,327 A | * | 8/1957 | Kerr, Jr. | B65G 13/00 193/18 |
| 3,921,786 A | * | 11/1975 | Hejmanowski | B65G 47/766 198/367 |

(Continued)

FOREIGN PATENT DOCUMENTS

| | | | | |
|---|---|---|---|---|
| CN | 108657800 A | * | 10/2018 | B07C 1/10 |
| CN | 110918488 A | * | 3/2020 | |

*Primary Examiner* — Gene O Crawford
*Assistant Examiner* — Keith R Campbell
(74) *Attorney, Agent, or Firm* — Kilpatrick Townsend & Stockton LLP

(57) ABSTRACT

A conveyance device can include a conveyance surface and a conveyance constraint. The conveyance surface can receive a container and advance the container along the conveyance pathway. The conveyance constraint can be positioned across the conveyance pathway and include an opening. The conveyance constraint can block containers having a width or height larger than the respective width or height of the opening.

16 Claims, 6 Drawing Sheets

(56) References Cited

U.S. PATENT DOCUMENTS

| 10,053,299 B1* | 8/2018 | Vadakkanmaruveedu ................... B65G 13/02 |
| 2011/0266199 A1* | 11/2011 | Barnett ................... B07C 5/342 209/552 |

* cited by examiner

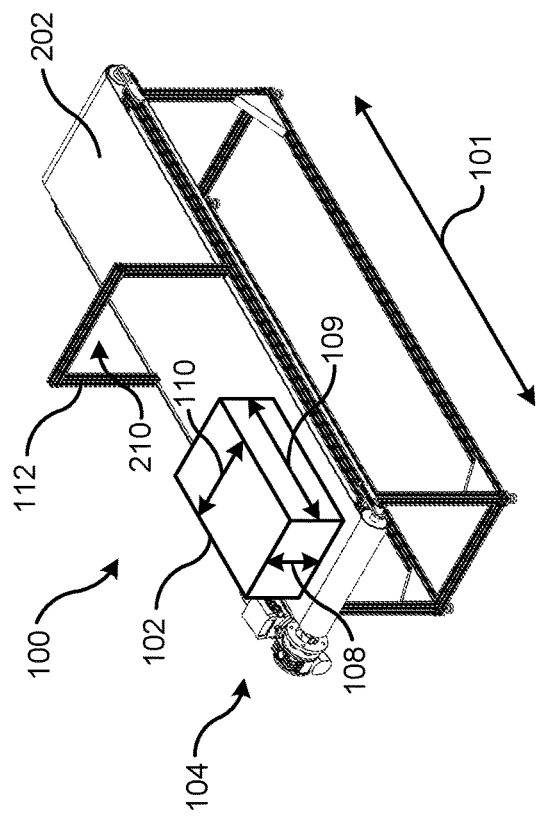
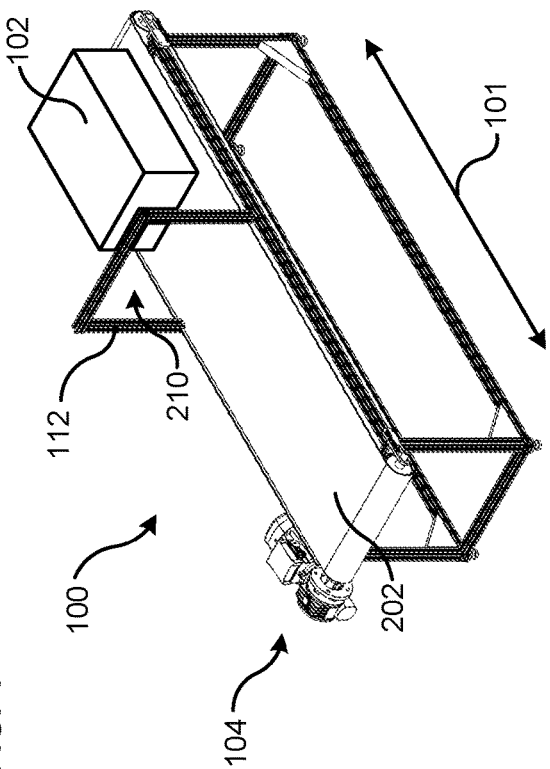
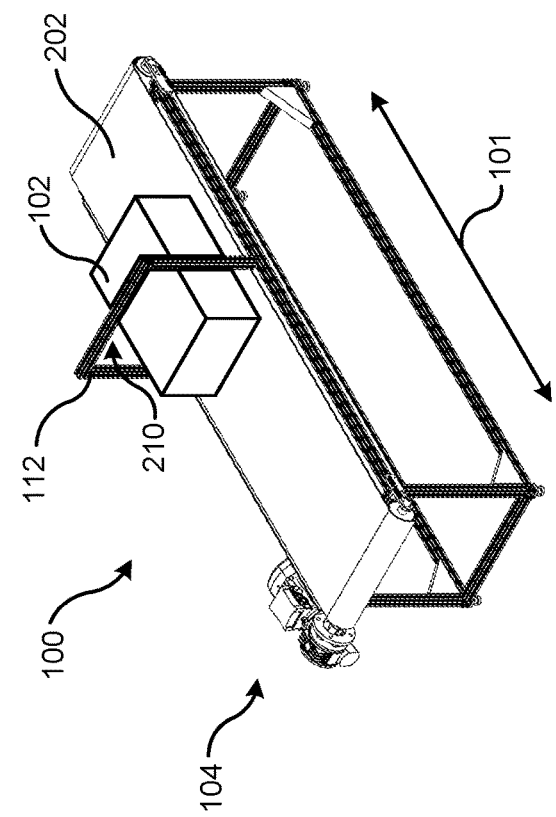

CONVEYANCE CONSTRAINT

BACKGROUND

Modern inventory systems, such as those in mail order warehouses, supply chain distribution centers, airport luggage systems, and custom-order manufacturing facilities, face significant challenges in responding to requests for inventory items. The items can be moved around the facility using, for example, conveyors. The items can be moved to various stations and/or locations containing machinery for sorting and/or processing the items. However, some of the machinery may be unable to process items above a certain threshold size. Items larger than the threshold size can damage the machinery which can result in expensive repairs and cause delays in the processing of the items.

BRIEF DESCRIPTION OF THE DRAWINGS

Various embodiments in accordance with the present disclosure will be described with reference to the drawings, in which:

FIGS. 4 through 6 illustrate various states of a container being moved along the conveyance system of FIG. 1, in accordance with embodiments;

DETAILED DESCRIPTION

Figure 1:
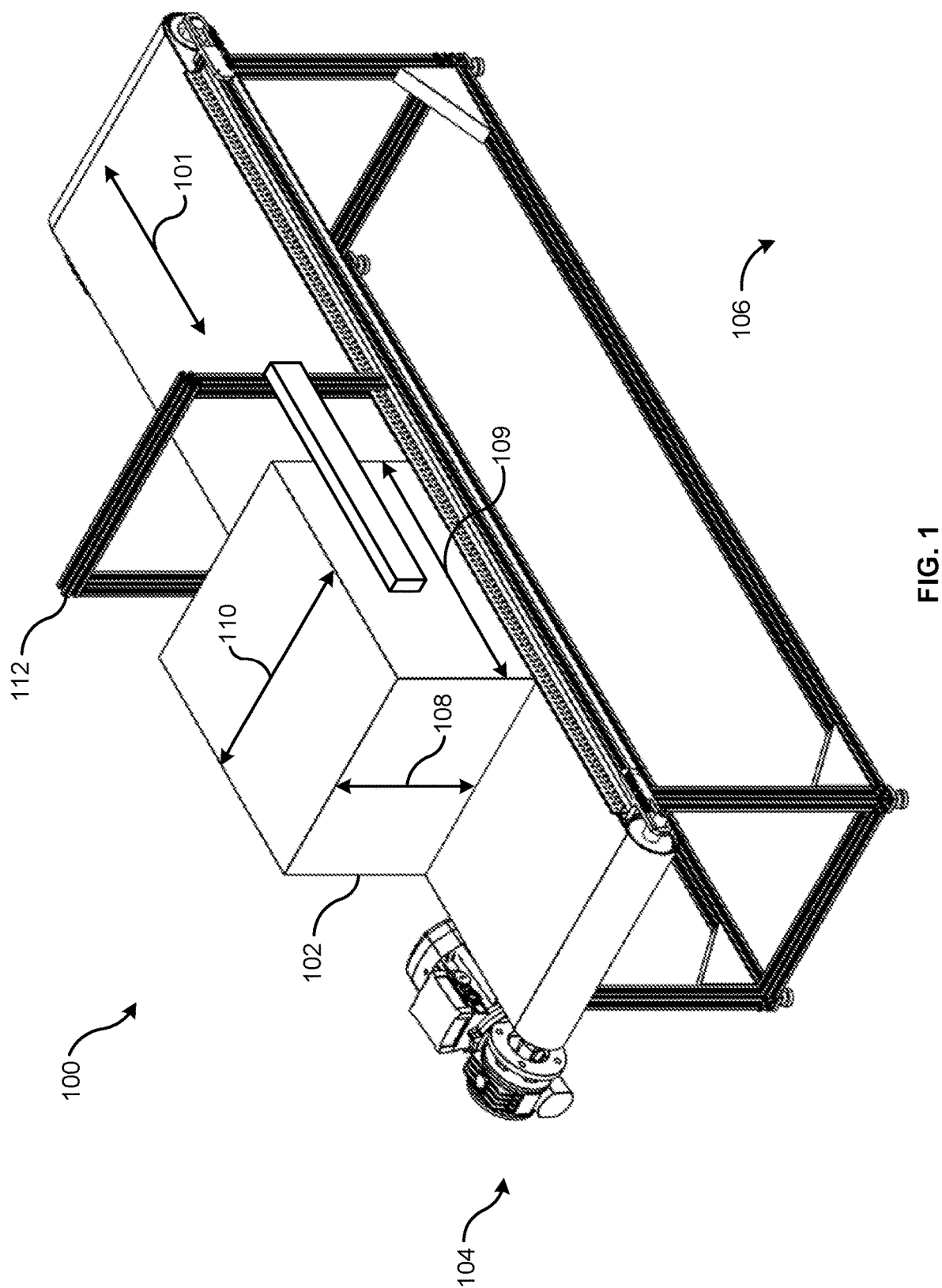
FIG. 1 illustrates a conveyance system that can advance containers, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a conveyance system for moving containers or other items. The techniques described herein may be implemented by any conveyance system, but particular examples described herein include a conveyance constraint for sorting containers of different sizes. The containers can be received on a conveyance surface. The conveyance surface can convey the containers along a conveyance pathway (e.g., from a first end of the conveyance surface to a second end of the conveyance surface). A conveyance constraint can be positioned across the conveyance pathway. The conveyance constraint can be sized such that some of the containers are blocked by the conveyance constraint (e.g., because the blocked containers have one or more dimensions larger than the corresponding dimensions of the conveyance constraint) and some of the containers can proceed through the conveyance pathway (e.g., because the containers have smaller dimensions than the corresponding dimensions of the conveyance constraint).

Turning now to a particular example, in this example, the conveyance system can include a conveyance device with a conveyance surface which can support received containers. The containers can each have dimensions (e.g., a container height, a container width, and a container length). The containers can be received onto the conveyance surface with the container length oriented along a conveyance pathway of the conveyance surface. A motor can be coupled with the conveyance surface to advance the conveyance surface, for example, to transport the received containers from a first end of the conveyance surface along the conveyance pathway. A conveyance constraint can be positioned across the conveyance pathway. The conveyance constraint can have an opening with an opening width and an opening height. The conveyance constraint can allow containers having a container width and a container height less than the respective opening width and opening height to advance through the opening. The conveyance constraint can additionally or alternatively block containers having a container height or a container width greater than the respective opening height or opening width of the opening from advancing through the opening.

In various embodiments, the conveyance surface can continue to advance below the containers blocked by the conveyance constraint. For example, the conveyance surface can be or include low friction material that can allow the conveyance surface to slide against the bottom surface of the container without damaging the container and/or the conveyance surface. In further embodiments, the containers blocked by the conveyance constraint can be removed from the conveyance surface (e.g., to allow other containers to advance through the opening). The containers can be removed, for example, by a user and/or a removal device.

While exemplary embodiments are described with reference to containers and container conveyance systems, and the like, the systems and techniques described herein are also applicable to any other items (e.g., inventory items, consumable items, and/or building materials) and/or suitable packaging containers (e.g., bags, boxes, totes, envelopes, pouches, cases, suitcases, sacks, jugs, and/or other similar containers).

Turning now to the figures, FIG. 1 illustrates a conveyance system 100, in accordance with embodiments, for moving and sorting containers 102. The conveyance system 100 can include a conveyance device 104 positioned in a warehouse environment 106, for example, in a warehouse environment 106 where containers 102 are being moved, sorted, and/or stored. The conveyance system 100 can additionally or alternatively be positioned in a vehicle (e.g., a truck and/or a van), a building, a store, a container, and/or any suitable environment where containers 102 are moved, sorted, and/or stored. The conveyance device 104 can be used to transport and/or sort the containers 102. For example, the conveyance device 104 can transport the containers 102 along a conveyance pathway 101 to processing equipment.

The containers 102 can have a height 108 (e.g., a container height), a length 109 (e.g., a container length), and a width 110 (e.g., a container width). In various embodiments, the length 109 can be the largest dimension of the container 102. The container 102 can be received by the conveyance device 104 with the length 109 oriented along the conveyance pathway 101 (e.g., with the length 109 being collinear or parallel with a longitudinal axis of the conveyance pathway 101).

Some of the containers 102 can be sized (e.g., have a height 108 and/or a width 110) such that the containers 102 may cause damage to—or be otherwise too large for—equipment in the warehouse environment 106. For example, the containers 102 can be oversized (e.g., the containers 102 can have a height 108 and/or a width 110 over the threshold limit of certain processing equipment), which can damage the processing equipment if the oversized containers 102 reach the processing equipment.

The oversized containers 102 can be blocked from proceeding along the conveyance pathway 101 by the conveyance system 100. For example, the conveyance device 104 can include or be arranged relative to a conveyance constraint 112 that can be positioned across the conveyance pathway 101. The conveyance constraint 112 can block the oversized containers 102 from traveling along the conveyance pathway 101 while allowing the correctly sized containers 102 to continue along the conveyance pathway 101. Blocking the oversized containers 102 from traveling along the conveyance pathway 101 can prevent the oversized containers 102 from reaching and damaging the processing equipment.

The containers 102 can define an area for receiving one or more inventory items. The inventory items can be transported in the containers 102 (e.g., around the warehouse environment 106). The containers 102 may include rigid or semi-rigid material, for example, plastic, cardboard, paper, or any suitable material for containing items. In some embodiments, the containers 102 can include handles, hooks, engagement surfaces, suctionable surfaces, or other features and/or components for engaging with the conveyance device 104 and/or with other elements of the conveyance system 100. In further embodiments, the containers 102 can be items, e.g., such that the items are moved by the conveyance system 100 without first being positioned in a container 102.

Figure 2:
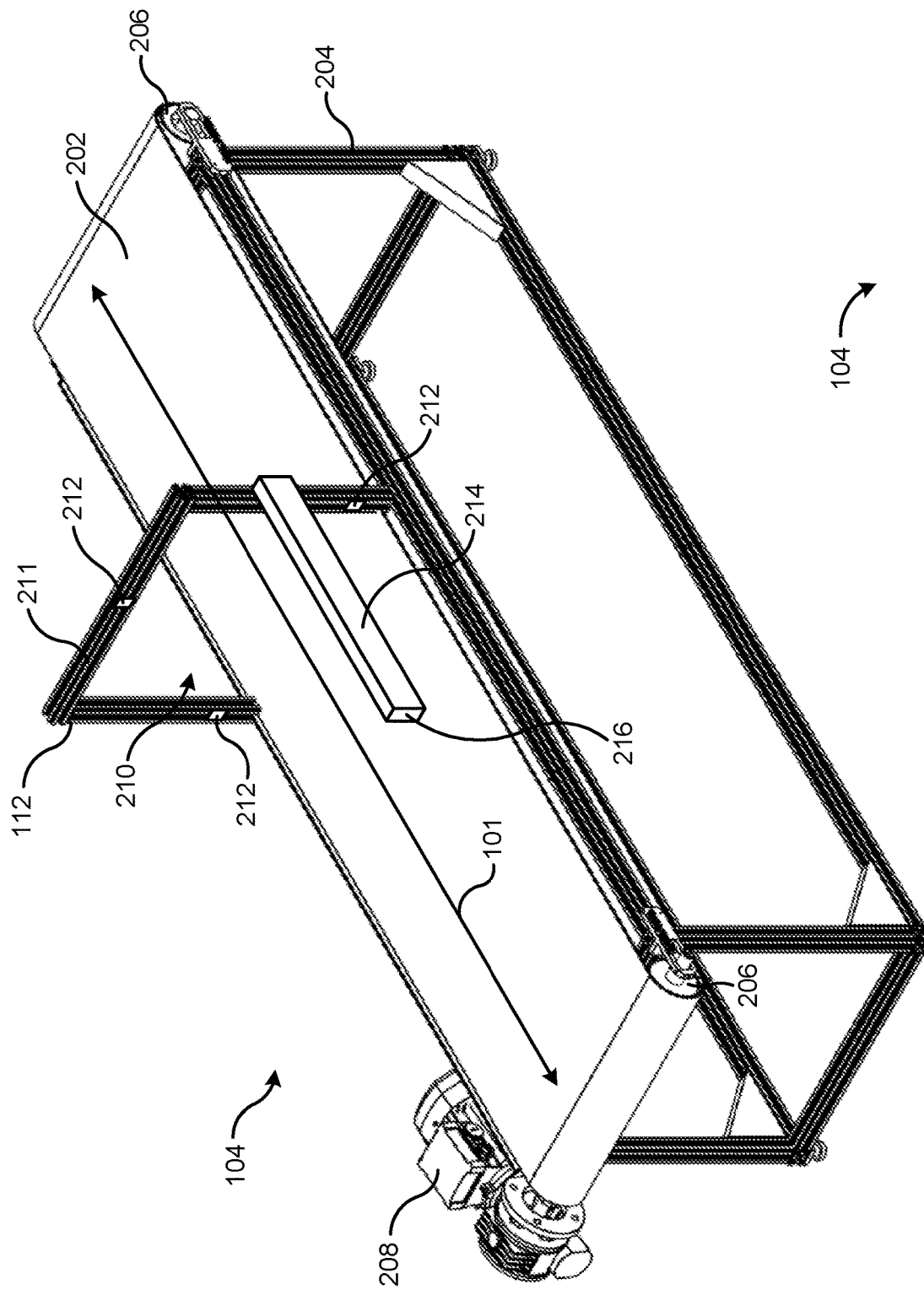
FIG. 2 illustrates a conveyance device for use with the conveyance system of FIG. 1, in accordance with various embodiments.

Turning to FIG. 2, an example conveyance device 104 is shown. The conveyance device 104 can include a conveyance surface 202 for receiving and transporting the containers 102. The conveyance surface 202 can be or include a belt, rollers, motor driven rollers, chains, a robotic manipulator, and/or any suitable device for transporting containers. In various embodiments, the conveyance surface 202 can be or include low-friction material. The low-friction material can allow the conveyance surface 202 to have enough friction with the containers 102 to transport the containers 102 along the conveyance pathway 101. The low-friction material can additionally or alternatively allow the conveyance surface 202 to continue to advance beneath a container 102 blocked by the conveyance constraint 112 without damaging the container 102. For example, the conveyance surface 202 can continue to advance below a container 102 when the container 102 is blocked by the conveyance constraint 112 without damaging the bottom of the container 102.

In various embodiments, the conveyance surface 202 can be supported by a chassis 204. The chassis 204 can be or include rigid or semi-rigid material that can support the weight of the conveyance device 104 and one or more containers 102 (e.g., containers 102 positioned on the conveyance surface 202). The chassis 204 can be positionable in the warehouse environment 106. For example, the chassis 204 can be positioned at a fixed position in the warehouse environment 106 by attaching the chassis 204 to the floor of the warehouse and/or to the structure of the warehouse. In some embodiments, the chassis 204 can be moveable around the warehouse environment 106. For example, the chassis 204 can be moveable between various positions in the warehouse environment 106 using wheels. The chassis 204 can be or include metal, plastic, carbon-fiber, and/or any suitable rigid or semi-rigid material.

The conveyance surface 202 can be supported by one or more rollers 206. The rollers 206 can support the conveyance surface 202 such that the conveyance surface 202 can receive the containers 102 and transport the containers 102 along the conveyance pathway 101. The rollers 206 can be connected to the chassis 204 such that the rollers 206 can rotate. The rollers 206 can rotate to advance the conveyance surface 202. For example, one or more of the rollers 206 can be a driven roller 206. The driven rollers 206 can advance the conveyance surface 202 along the conveyance pathway 101. However, one or more of the rollers 206 can be or include an idle roller 206. The idle rollers 206 can support the conveyance surface 202 and can rotate in response to the conveyance surface advancing.

In various embodiments, the driven rollers 206 can be connected to a motor 208 that can rotate the driven rollers 206. The motor 208 can rotate the driven rollers 206 to advance the conveyance surface 202 and transport the containers 102 (e.g., along the conveyance pathway 101). The motor 208 can be or include an AC motor, a DC motor, a stepper motor, a direct drive motor, a linear motor, a servo motor, and/or any suitable motor for rotating the driven rollers 206.

The conveyance surface 202 can receive the containers 102 (e.g., at a first end of the conveyance surface) and transport the containers 102 (e.g., towards the conveyance constraint 112). The conveyance constraint 112 can be coupled to the chassis 204. The conveyance constraint 112 can be or include a frame 211 surrounding an opening 210. The conveyance constraint 112 can be or include one or more rigid or semi-rigid members that can block oversized containers 102. For example, the conveyance constraint 112 can be or include metal members surrounding the opening 210.

Figure 3:
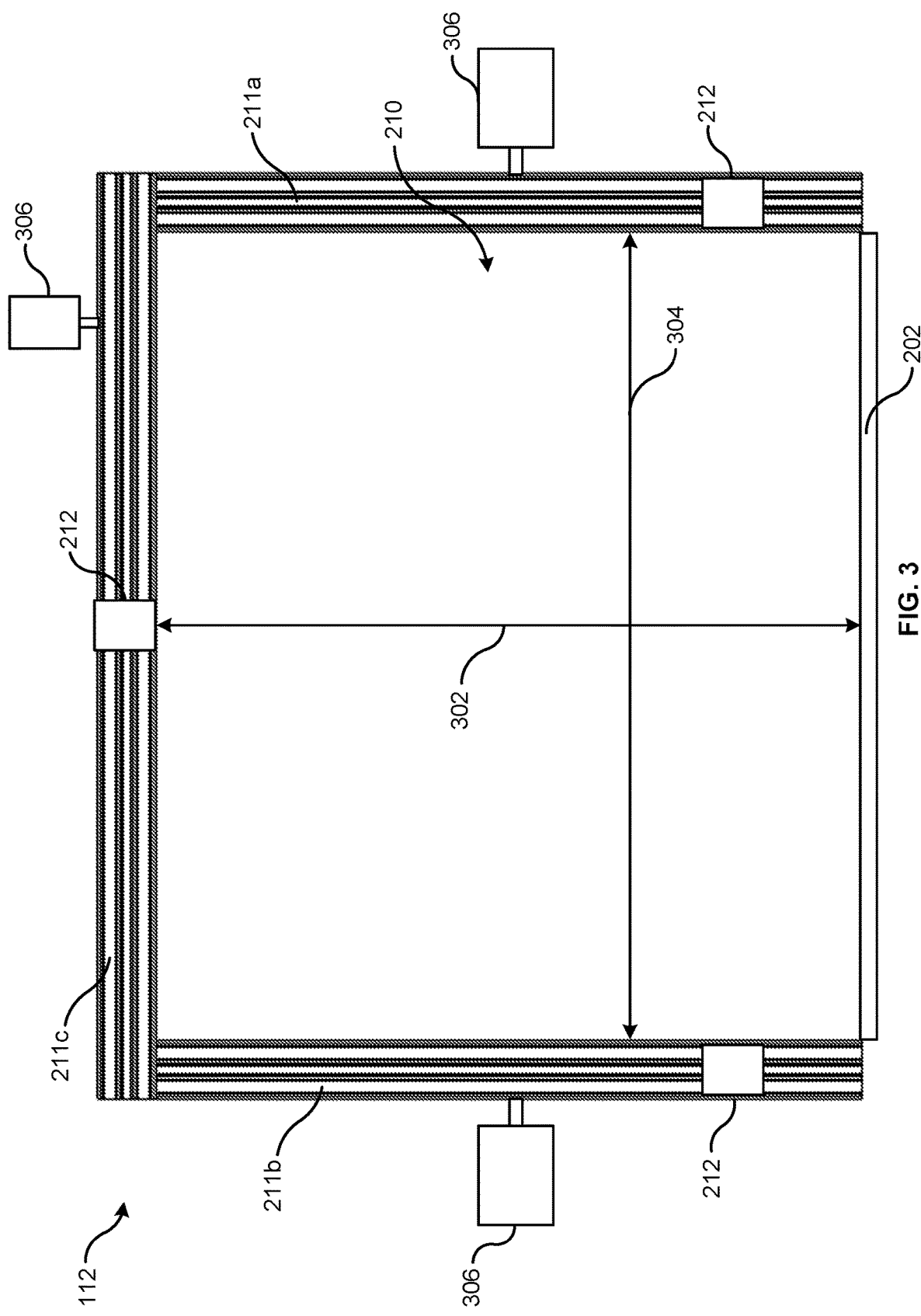
FIG. 3 illustrates a conveyance constraint for use with the conveyance system of FIG. 1, in accordance with various embodiments.

As discussed further in reference to FIG. 3, the opening 210 can have a height (e.g., an opening height) and width (e.g., an opening width). The opening 210 of the conveyance constraint 112 can allow containers 102 having a height and width less than the respective height and width of the opening 210 to advance through the opening 210. The frame 211 of the conveyance constraint 112 can block containers 102 having a height or width greater than the respective height or width of the opening 210 from advancing through the opening 210.

In various embodiments, the conveyance system 100 can include one or more sensors 212. The one or more sensors 212 can be positioned to detect when a container 102 has been blocked by the conveyance constraint 112. For example, the sensors 212 can be coupled with the conveyance constraint 112 to detect when a container 102 is contacting the conveyance constraint 112. However, the sensors 212 can be separate from the conveyance constraint 112. In some embodiments, the sensors 212 can be or include a camera that can be used to detect when a container 102 has been blocked by the conveyance constraint 112. The sensors 212 can be or include a force sensor, a contact sensor, a switch, a proximity sensor, an infrared sensor, a camera, and/or any suitable sensor for detecting when a container 102 has been blocked by the conveyance constraint 112.

In further embodiments, the conveyance system 100 can include a removal device 214. The removal device 214 can remove containers 102 that are blocked by the conveyance constraint 112. For example, the removal device 214 can move containers 102 blocked by the conveyance constraint 112 off of the conveyance surface 202. In various embodiments, the removal device 214 can receive a signal from the sensors 212 that a container 102 has been blocked by the conveyance constraint 112 and the removal device 214 can remove the blocked container 102.

The removal device 214 can be attached to the conveyance constraint 112 and/or the chassis 204. However, the removal device 214 can be separate from the conveyance device 104. In some embodiments, the removal device 214 can be or include an actuator that can remove a blocked container 102 from the conveyance surface 202 (e.g., by pushing, pulling, and/or lifting the blocked container 102 off of the side of the conveyance surface). The removal device 214 can additionally or alternatively be or include a robotic manipulator and/or a user. For example, the robotic manipulator and/or the user can remove the blocked container 102 from the conveyance surface 202 (e.g., by pushing or pulling the container off the side of the conveyance surface 202 and/or by lifting the container 102 off of the conveyance surface 202).

In various embodiments, the removal device can be or include an end effector 216. The end effector 216 can engage with the container 102 to move the container 102 off of the conveyance surface 202. The end effector 216 can be or include a suction cup, a hook, a magnet, hook and loop connectors, adhesives, and/or any suitable mechanism for engaging with the containers 102.

Turning to FIG. 3, an example, conveyance constraint 112 is shown. The conveyance constraint 112 can include an opening 210 defined by a frame 211 and the conveyance surface 202. The opening 210 can include a height 302 (e.g., an opening height) and a width 304 (e.g., an opening width). The height 302 and/or the width 304 of the opening 210 can be the same as or slightly less than the threshold size for a piece of processing equipment. For example, the height 302 and/or the width 304 of the opening 210 can block containers 102 that can damage the processing equipment.

In various embodiments, one or more portions of the frame 211 (e.g., sides 211a and 211b and upper portion 211c) can move, for example, to change the size of the opening 210. The one or more portions of the frame 211 can move to change the size of the opening 210 while the conveyance surface 202 is advancing (e.g., while containers 102 are being transported by conveyance surface 202). However, the one or more portions of the frame 211 can move when the conveyance surface 202 is stopped. The portions of the frame 211 can be moved based on one or more characteristics of the containers 102. For example, the size (e.g., height 302 and width 304) of the opening 210 can be changed based on the volume of containers 102. Two containers 102 can have the same volume and different dimensions (e.g., different heights 108, lengths 109, and/or widths 110). The portions of the frame 211 can move to allow both containers 102 to move through the opening 210.

One or both of the sides 211a and 211b can move to change the width 304 of the opening 210 and/or the upper portion 211c can move to change the height 302 of the opening 210. For example, one of the sides 211a or 211b can be stationary and the other of the sides 211a or 211b can move relative to the stationary side to change the width 304 of the opening 210. However, both of the sides 211a and 211b can move (e.g., relative to one another).

In further embodiments, one or more of the portions of the frame 211 can be connected to a support structure. The support structure can include at least one rail, track, or other structure that can aid in or facilitate the movement of the portions of the frame 211. For example, the support structure can allow the upper portion 211c to move along a vertical direction and/or can allow the sides 211a and 211b to move along a horizontal direction.

In some embodiments, one or more actuators 306 can be coupled with the frame 211. For example, an actuator 306 can be coupled with frame 211 to independently move portions of the frame 211 (e.g., to move each of the sides 211a and 211b and/or the upper portion 211c). However, an actuator 306 can be coupled with the frame 211 to move multiple portions (e.g., a single actuator 306 can move a side 211a or 211b and the upper portion 211c and/or a single actuator 306 can move both of the sides 211a and 211b). The actuators 306 can move the portions of the frame 211 in response to a signal. For example, the actuators 306 can move the portions of the frame 211 in response to a signal from one or more of the sensors 212. The actuators 306 can be or include a linear actuator, a rotary actuator, a hydraulic actuator, a pneumatic actuator, an electric actuator, a mechanical actuator, a supercoiled polymer actuator, a motorized lead screw, a worm drive, a piezoelectric actuator, a solenoid, a linear induction motor, a linear synchronous motor, a magnetic rotor, and/or any suitable device for moving one or more portions of the frame 211.

Figure 7:
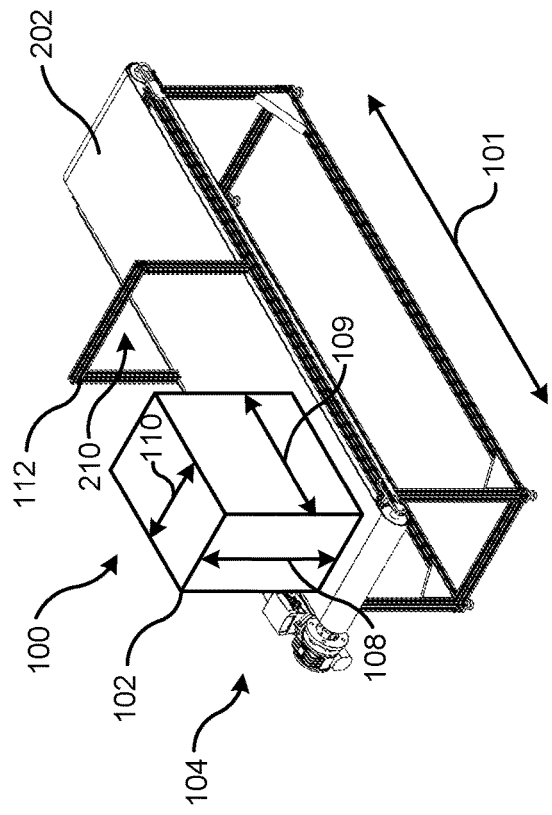
FIGS. 7 through 9 illustrates various states of an over-height container being moved along the conveyance system of FIG. 1, in accordance with embodiments.
Figure 9:
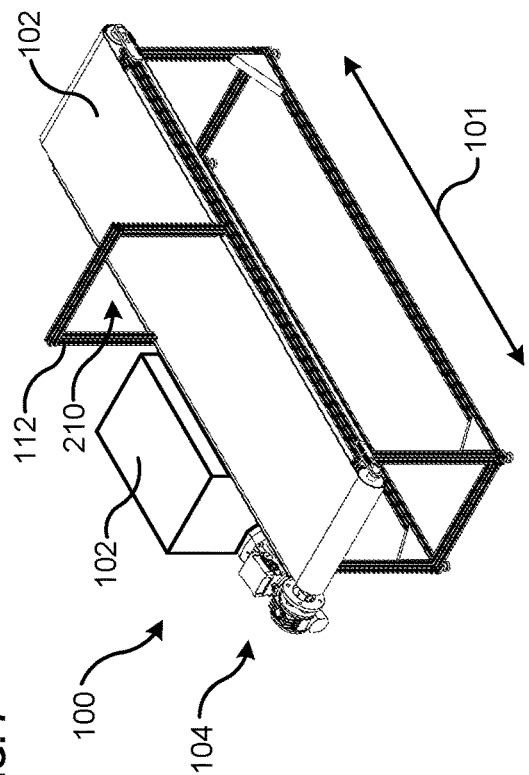
Figure 8:
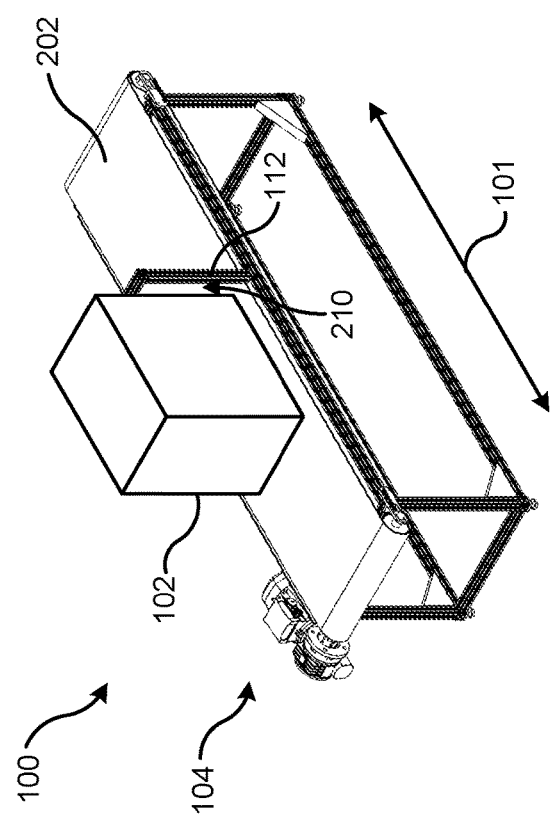
Figure 10:
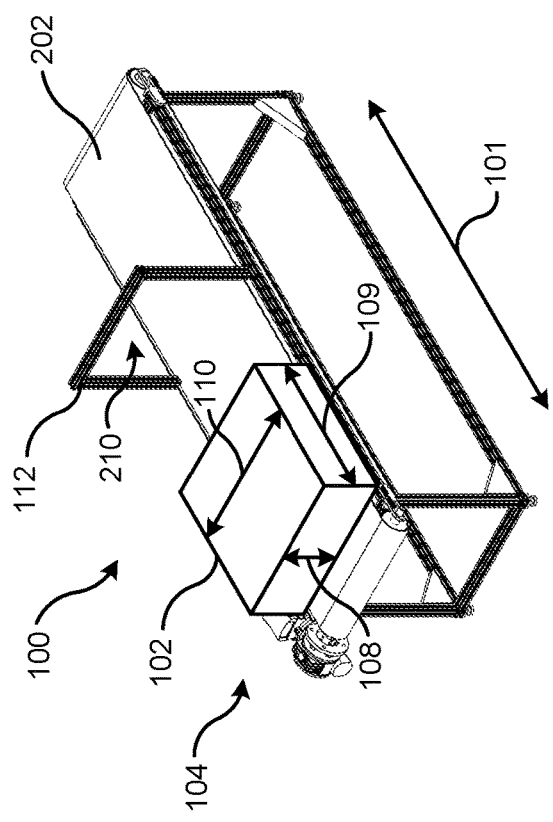
FIGS. 10 through 12 illustrates various states of an over-width container being moved along the conveyance system of FIG. 1, in accordance with embodiments.
Figure 12:
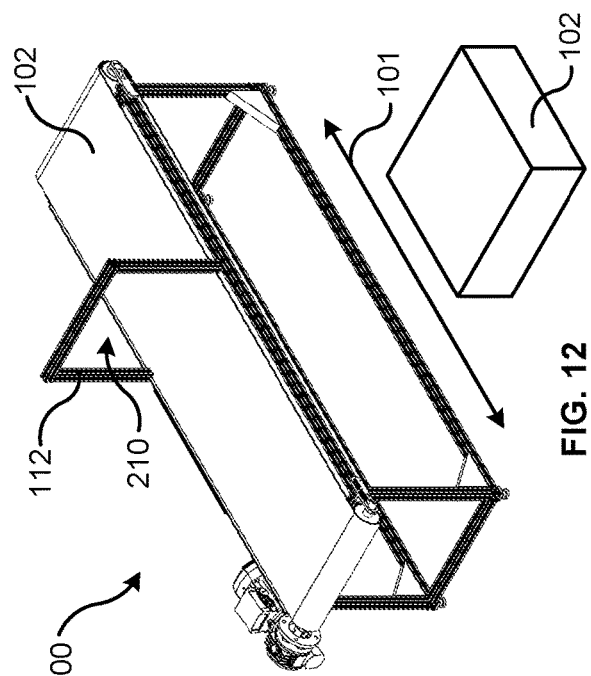
Figure 11:
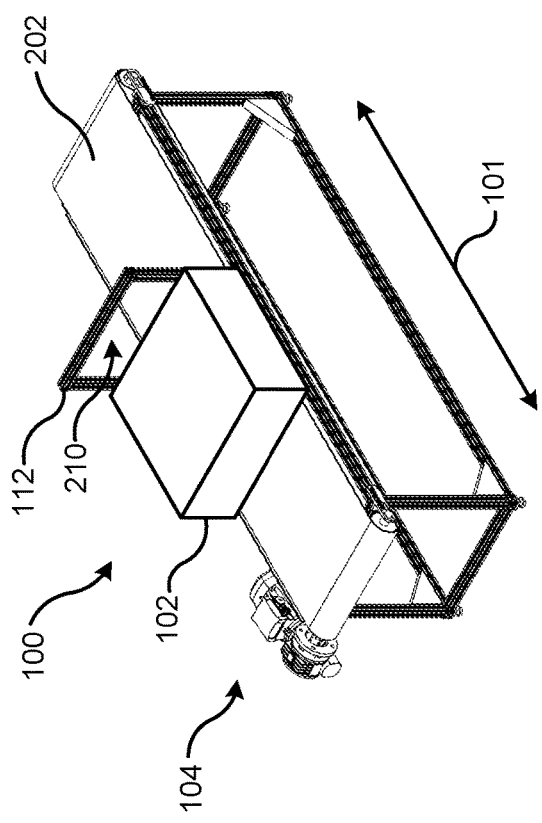

FIGS. 4 through 12 illustrate various states of a container 102 being moved along the conveyance system 100. Specifically, FIGS. 4 through 6 show a container 102 that has a height 108 and a width 110 smaller than the corresponding height 302 and the width 304 of the opening 210. FIGS. 7 through 9 show an over-height container 102 with a height 108 that is larger than the corresponding height 302 of the opening 210. FIGS. 10 through 12 show an over-width container 102 with a width 110 larger than the corresponding width 304 of the opening 210.

As shown in FIGS. 4, 7, and 10, the conveyance device 104 can receive a container 102. The container 102 can be received on the conveyance surface 202. The container 102 can be received with the length 109 oriented along the conveyance pathway 101 (e.g., with the length 109 being collinear or parallel with the conveyance pathway 101).

As shown in FIGS. 5, 8, and 11, the conveyance device 104 can transport the container 102 (e.g., along the conveyance pathway 101). The conveyance device 104 can transport the container 102 by advancing the conveyance surface 202. As shown in FIGS. 5 and 6, the container 102 having a height 108 and a width 110 smaller than the corresponding height 302 and width 304 of the opening 210 can advance through the opening 210. The container 102 can advance through the opening 210 to a second end of the conveyance device 104 and/or to a position for further processing of the container 102.

As shown in FIGS. 8 and 9, the over-height container 102 with a height 108 that is larger than the corresponding height 302 of the opening 210 can be blocked from advancing through the opening 210. The conveyance surface 202 can continue to advance beneath the blocked container 102. As shown in FIG. 9, the blocked container 102 can be removed from the conveyance surface 202. The blocked container 102 can be removed from the conveyance surface 202 to allow other containers 102 to travel on the conveyance surface (e.g., along the conveyance pathway 101). The blocked container 102 can be moved to a side of the conveyance device 104. Additionally or alternatively, the blocked container 102 can be lifted off of the conveyance device 104 (e.g., and moved to another location in the warehouse environment 106).

As shown in FIGS. 11 and 12, the over-width container 102 with a width 110 that is larger than the corresponding width 304 of the opening 210 can be blocked from advancing through the opening 210. As shown in FIG. 12, the blocked container 102 can be removed from the conveyance surface 202. The blocked container 102 can be removed from the conveyance device 104 in the same direction and/or using the same or similar methods as the over-height container 102 shown in FIG. 9. However, the blocked containers 102 may be removed in a different direction and/or using the different methods.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A conveyance system, comprising:
a plurality of containers, each of the plurality of containers defining a container length, a container height, and a container width of that respective container; and
a conveyance device positionable in a warehouse environment, the conveyance device comprising:
a chassis;
a conveyance surface coupled with the chassis and comprising a low friction material, the conveyance surface configured to support a received container from the plurality of containers, the received container arranged with the container length being oriented along a direction of travel;
a motor coupled with the chassis and configured to advance the conveyance surface to transport the received container from a first end of the conveyance device to a second end of the conveyance device along the direction of travel;
a conveyance constraint coupled with the chassis and defining an opening having an opening height and an opening width, the conveyance constraint configured to (i) allow containers of the plurality of containers having a container height and a container width that are less than the respective opening height and opening width of the opening to advance through the opening and (ii) block containers of the plurality of containers having a container height or a container width greater than the respective opening height or opening width of the opening from advancing through the opening;
a first sensor set comprising at least one first sensor configured to detect when a container has been blocked by the conveyance constraint along the opening height;
a first actuator set comprising at least one first actuator configured to move at least a first portion of the conveyance constraint to change the opening height;
a second sensor set comprising at least one second sensor configured to detect when a container has been blocked by the conveyance constraint along the opening width: and
a second actuator set comprising at least one second actuator configured to move at least a second portion of the conveyance constraint to change the opening width.

2. The conveyance system of claim 1, further comprising a removal device configured to move the containers blocked by the conveyance constraint off of the conveyance surface.

3. The conveyance system of claim 1, wherein at least one of the first sensor set or the second sensor set includes one or more of a force sensor, a contact sensor, a switch, a proximity sensor, an infrared sensor, or a camera.

4. The conveyance system of claim 1, wherein the motor is further configured to advance the conveyance surface beneath the containers blocked by the conveyance constraint.

5. The conveyance system of claim 1, wherein the conveyance constraint comprises a frame that cooperates with the conveyance surface to define the opening.

6. A conveyance device, comprising:
a conveyance surface coupled with a chassis, the conveyance surface configured to support a received container from a plurality of containers;
a motor coupled with the chassis and configured to advance the conveyance surface to transport the received container from a first end of the conveyance device to a second end of the conveyance device along a conveyance direction; and
a conveyance constraint defining an opening having an opening height and an opening width, the conveyance constraint configured to allow those containers of the plurality of containers having a container height and a container width that are less than the respective opening height and opening width to move through the opening and block those containers of the plurality of containers having a container height or a container width greater than the respective opening height or opening width from advancing through the opening;
a first sensor set comprising at least one first sensor configured to detect when a container has been blocked by the conveyance constraint along the opening height;
a first actuator set comprising at least one first actuator configured to move at least a first portion of the conveyance constraint to change the opening height;
a second sensor set comprising at least one second sensor configured to detect when a container has been blocked by the conveyance constraint along the opening width; and
a second actuator set comprising at least one second actuator configured to move at least a second portion of the conveyance constraint to change the opening width.

7. The conveyance device of claim 6, wherein the conveyance surface comprises a belt configured to receive the plurality of containers and rollers coupled with the motor, the rollers configured to engage with the belt to transport the received container.

8. The conveyance device of claim 7, wherein the conveyance surface comprises low-friction material.

9. The conveyance device of claim 8, wherein the motor is further configured to advance the conveyance surface beneath the containers blocked by the conveyance constraint.

10. The conveyance device of claim 6, further comprising a removal actuator configured to remove the blocked containers from the conveyance surface.

11. The conveyance device of claim 10, wherein the removal actuator comprises an end effector configured to engage with the blocked containers.

12. A conveyance device comprising:
a conveyance constraint positionable across a conveyance pathway, the conveyance constraint comprising a frame cooperable with a conveyance surface to define an opening having an opening height and an opening width, the frame allowing containers positioned on the conveyance surface and having a container height and a container width less than the respective opening height and opening width of the opening to advance into the opening and blocking containers positioned on the conveyance surface and having a container height or container width that are greater than the respective opening height or opening width of the opening from advancing through the opening;
a first sensor set comprising at least one first sensor configured to detect when a container has been blocked by the conveyance constraint along the opening height;
a first actuator set comprising at least one first actuator configured to move at least a first portion of the conveyance constraint to change the opening height;
a second sensor set comprising at least one second sensor configured to detect when a container has been blocked by the conveyance constraint along the opening width;
a second actuator set comprising at least one second actuator configured to move at least a second portion of the conveyance constraint to change the opening width; and
a removal device configured to move containers blocked by the conveyance constraint off of the conveyance surface.

13. The conveyance device of claim 12, wherein the removal device comprises a removal actuator.

14. The conveyance device of claim 12, wherein the removal device comprises an end effector configured to engage with the containers.

15. The conveyance device of claim 12, further comprising the conveyance surface, wherein the conveyance surface comprises low friction material.

16. The conveyance device of claim 15, further comprising a motor configured to advance the conveyance surface beneath the containers blocked by the conveyance constraint.

* * * * *